Figure 1:
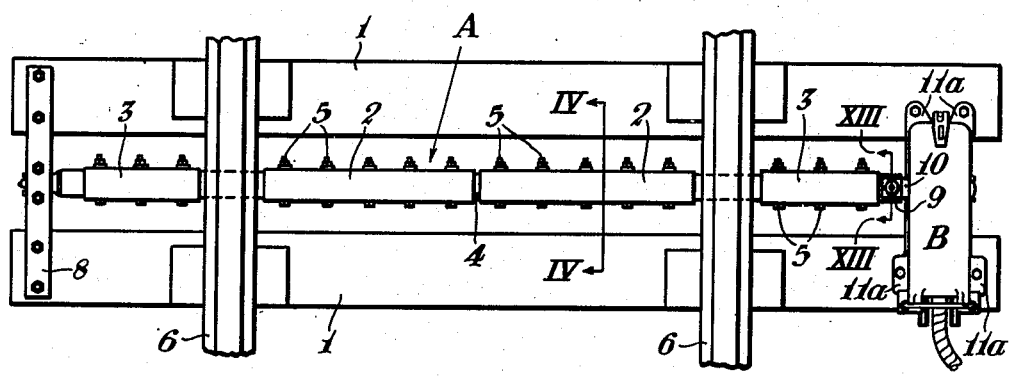

April 27, 1954     R. A. WOODS ET AL     2,677,048
DRAGGING EQUIPMENT DETECTOR

Filed May 19, 1948

INVENTORS.
Robert A. Woods and
Herbert L. Bone
BY
THEIR ATTORNEY

April 27, 1954  R. A. WOODS ET AL  2,677,048
DRAGGING EQUIPMENT DETECTOR
Filed May 19, 1948  7 Sheets-Sheet 2
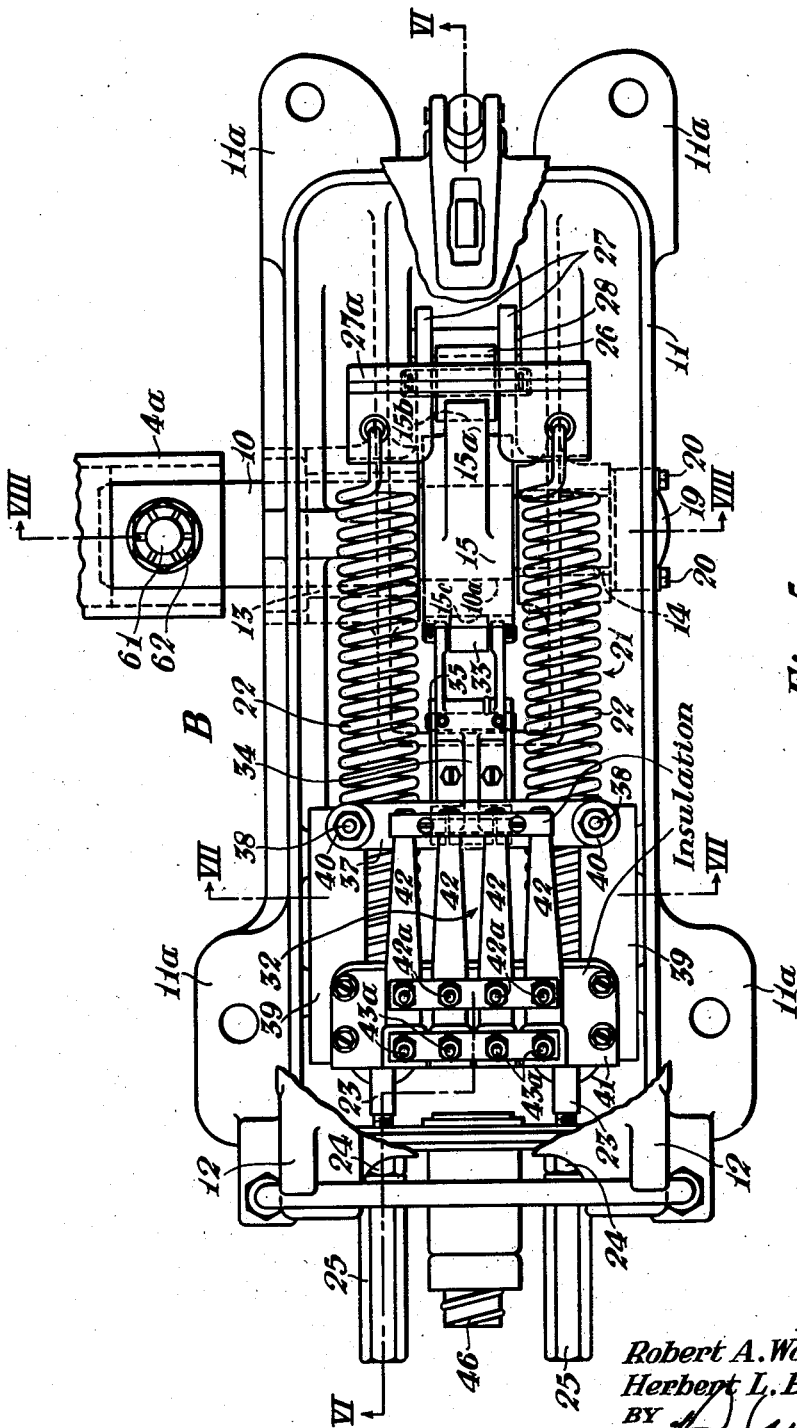
Fig. 5.
INVENTORS.
*Robert A. Woods and
Herbert L. Bone*
BY 
*THEIR ATTORNEY*

April 27, 1954    R. A. WOODS ET AL    2,677,048
DRAGGING EQUIPMENT DETECTOR
Filed May 19, 1948    7 Sheets-Sheet 3

INVENTORS.
Robert A. Woods and
Herbert L. Bone
BY
THEIR ATTORNEY

INVENTORS.
Robert A. Woods and
Herbert D. Bone
BY
THEIR ATTORNEY

INVENTORS.
Robert A. Woods and
Herbert L. Bone
BY
THEIR ATTORNEY

INVENTORS.
Robert A. Woods and
Herbert L. Bone

Patented Apr. 27, 1954

2,677,048

UNITED STATES PATENT OFFICE 2,677,048

DRAGGING EQUIPMENT DETECTOR

Robert A. Woods, Verona, and Herbert L. Bone, Forest Hills, Pa., assignors to Westinghouse Air Brake Company, a corporation of Pennsylvania Application May 19, 1948, Serial No. 27,864

1 Claim. (Cl. 246—246)

Our invention relates to dragging equipment detectors, that is, to devices adapted to be located along a railway track for detecting objects which are hanging or dragging from passing vehicles and which are likely to cause damage or derailment.

Dragging equipment detectors embodying our invention are particularly suitable for, although in no way limited to, use in advance of locations where derailments due to dragging objects are most likely to occur, such as switches, bridges, or tunnels, and they function when struck by a dragging object to actuate a warning signal in advance of the train so that the engineer will be able to bring his train to a stop before reaching the dangerous location.

One well-known form of dragging equipment detector comprises one or more detector plates attached to a rocker shaft pivotally mounted beneath the track rails in such manner that the plates and shaft are free to swing as a unit through a limited angle in either direction from an intermediate position in which the plates are substantially vertical. The shaft is operatively connected at one of its ends with suitable means for biasing it to its intermediate position and also with a circuit controller, the contacts of which are actuated in response to movement of the shaft in either direction from its intermediate position. The circuit controller controls suitable signal circuits for providing a warning to a train to stop whenever the detector is actuated due to dragging equipment.

In detectors of the type described it is highly desirable to provide means for preventing malicious or accidental actuation of the detector. This is usually accomplished by placing a shearable pin or the like in the mechanism for resisting movement of the shaft from its intermediate position with a predetermined force depending on the size of the pin and the material of which it is made. Accordingly, the pin is designed to resist movement of the detector by a force which is high enough to prevent improper actuation of the detector, but which is not sufficiently high to resist operation when the detector is struck by a dragging object likely to cause damage. It will be obvious that in detectors of this type it is necessary to replace the broken pin following an actuation in order that the detector be protected against a subsequent improper actuation. This may involve considerable time and expense, and it is one object of our invention to provide a detector of the type described which is responsive to the usual dragging equipment likely to cause damage but which prevents malicious or accidental actuation without the need for replacement of any parts after the detector has been actuated to restore it to its normal operative condition for subsequent actuation.

Another object of our invention is the provision in a dragging equipment detector of the type above referred to of an arrangement for combining in one compact mechanism the circuit controller and the means for biasing the detector plates and rocker shaft to their intermediate positions.

Still another object of our invention is the provision in a dragging equipment detector of means for rendering the biasing and circuit controlling mechanism substantially free from damage due to the shock caused when the detector is struck by an object dragging from a train.

According to our invention, the detector member is pivotally mounted in the trackway in a position to be struck by dragging equipment, and is operatively connected through a shock absorbing coupling with a mechanism which includes in a single compact housing means for biasing the member to its normal operative position and a circuit controller mechanism responsive to actuation of the member from its normal operative position. The biasing means in its preferred form comprises suitable springs acting through a lever and cam arrangement to bias the detector member to an intermediate position in such manner that it is free to rotate in opposition to the bias, when struck by dragging equipment, to one or the other of two extreme positions depending upon the directions in which the vehicle carrying the dragging equipment is moving. The force exerted by the springs is adjustable, and the cam and lever arrangement are so designed and the parts are so proportioned that the force required to initially move the detector member from its normal position is sufficiently high to prevent accidental or malicious actuation, but that, this force is not high enough to prevent actuation when the member is struck by a dragging object having sufficient size to cause a possible dangerous condition if the presence of the dragging object were not detected. The cam forming part of the spring biasing means also serves as a means for actuating the circuit controller. In the preferred form of our invention, the biasing means comprises coil springs, and in an alternate form of our invention the biasing means comprises leaf type springs.

Other objects and characteristic features of the invention will become apparent as the description proceeds.

We shall describe three forms of dragging equipment detectors embodying our invention, and shall then point out the novel features thereof in claims.

Figure 2:
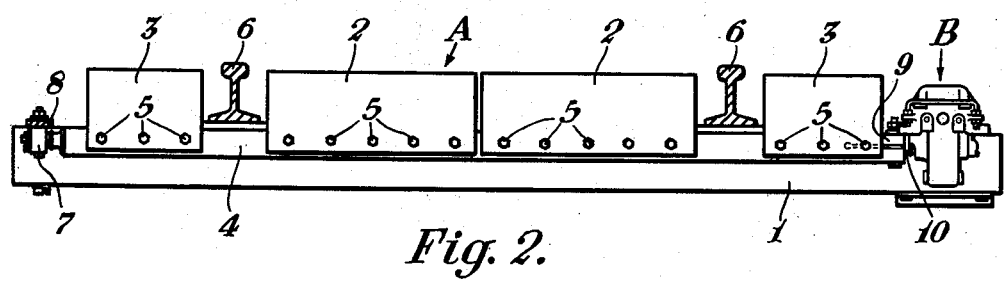
Figure 3:
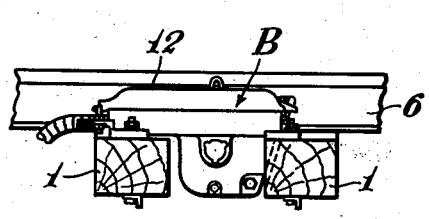
Figure 4:
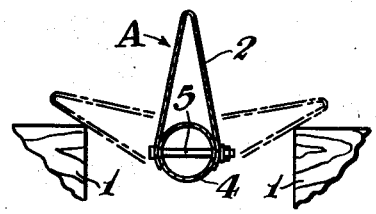
Figure 13:
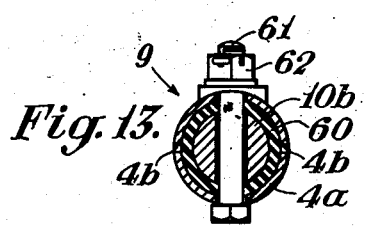
Figure 6:
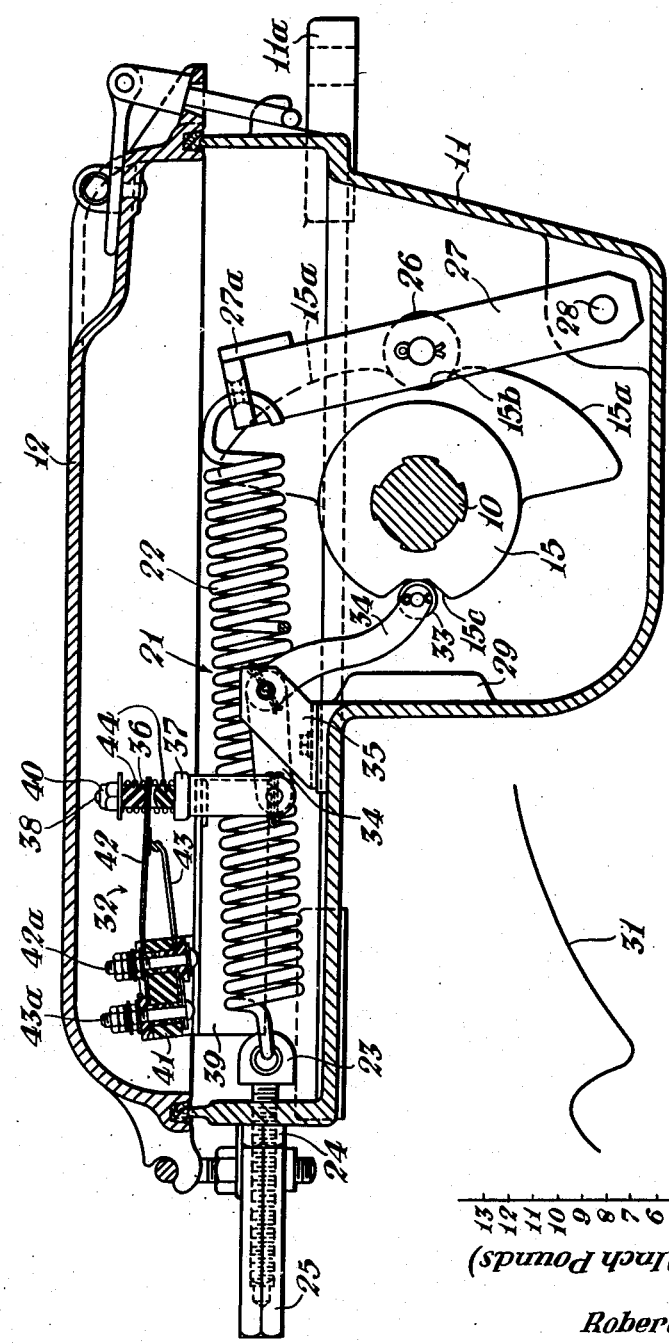
Figure 9:
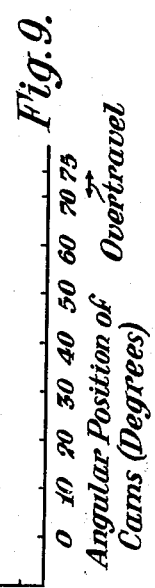
Figure 7:
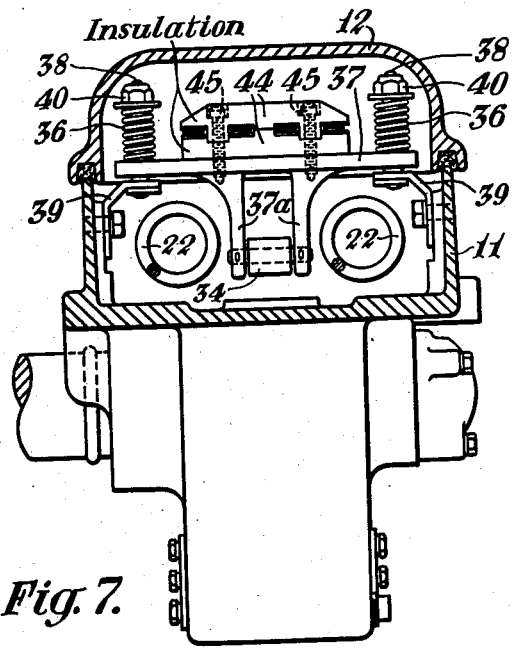
Figure 8:
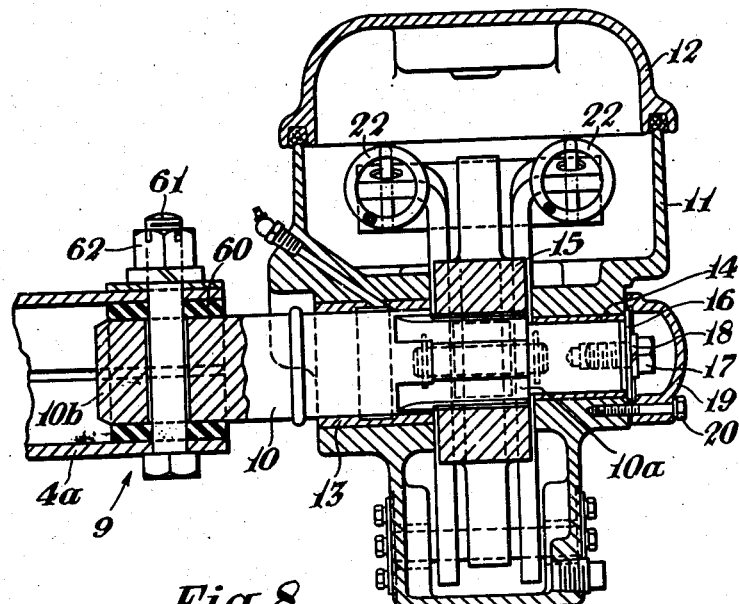
Figure 10:
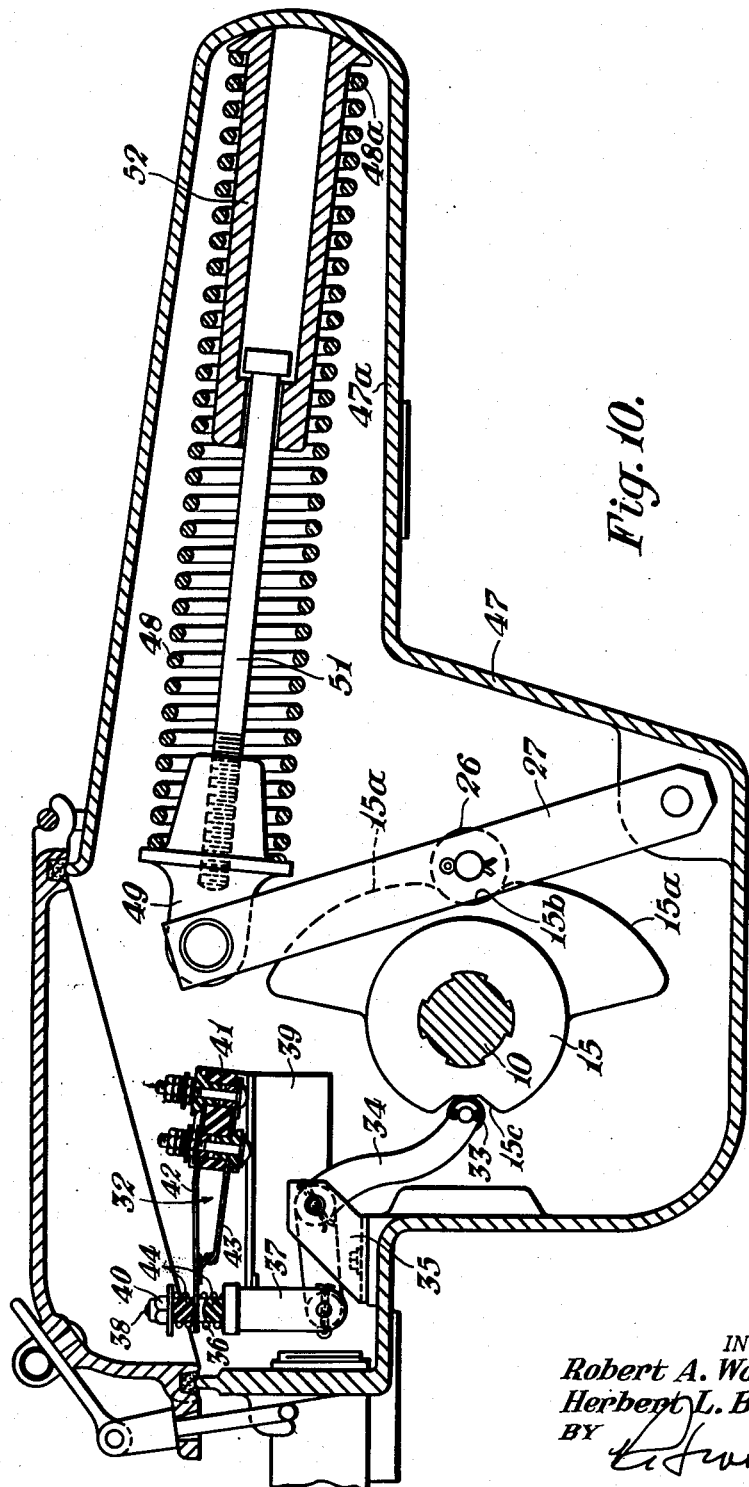
Figure 11:
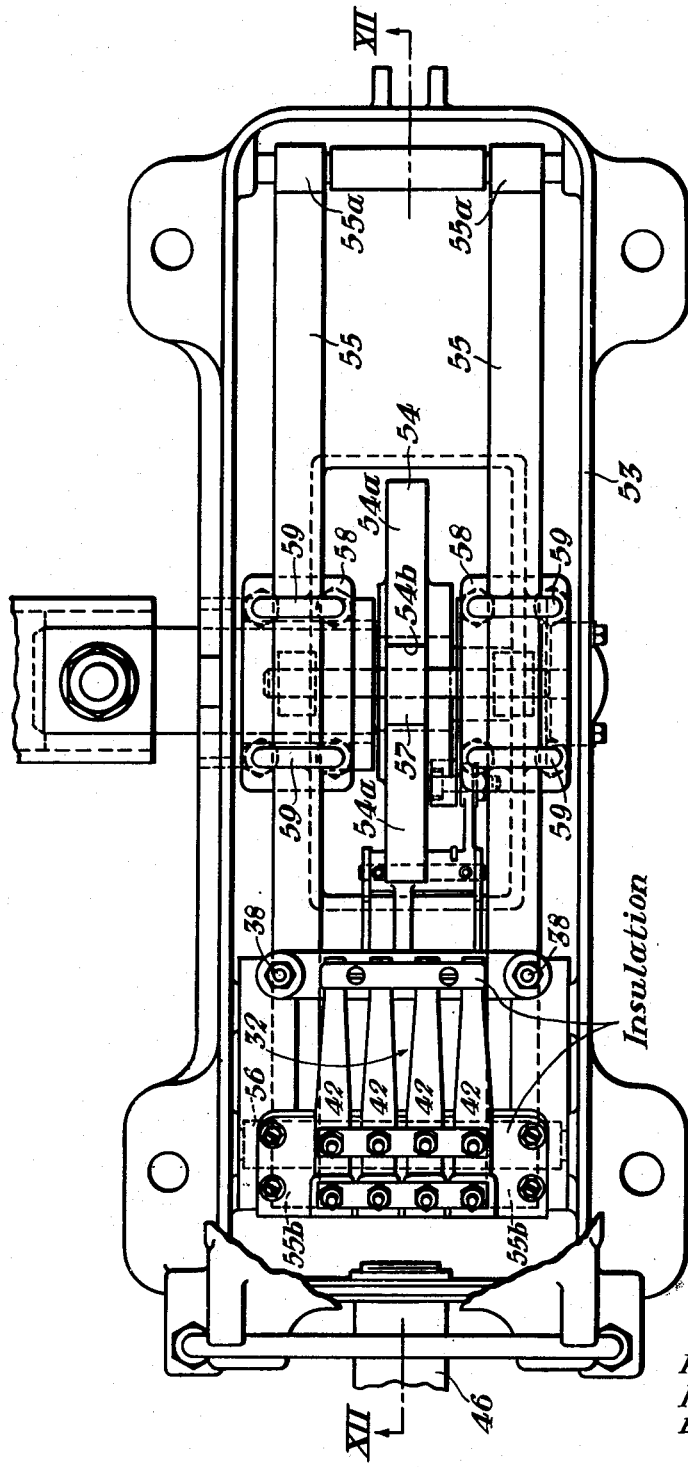
Figure 12:
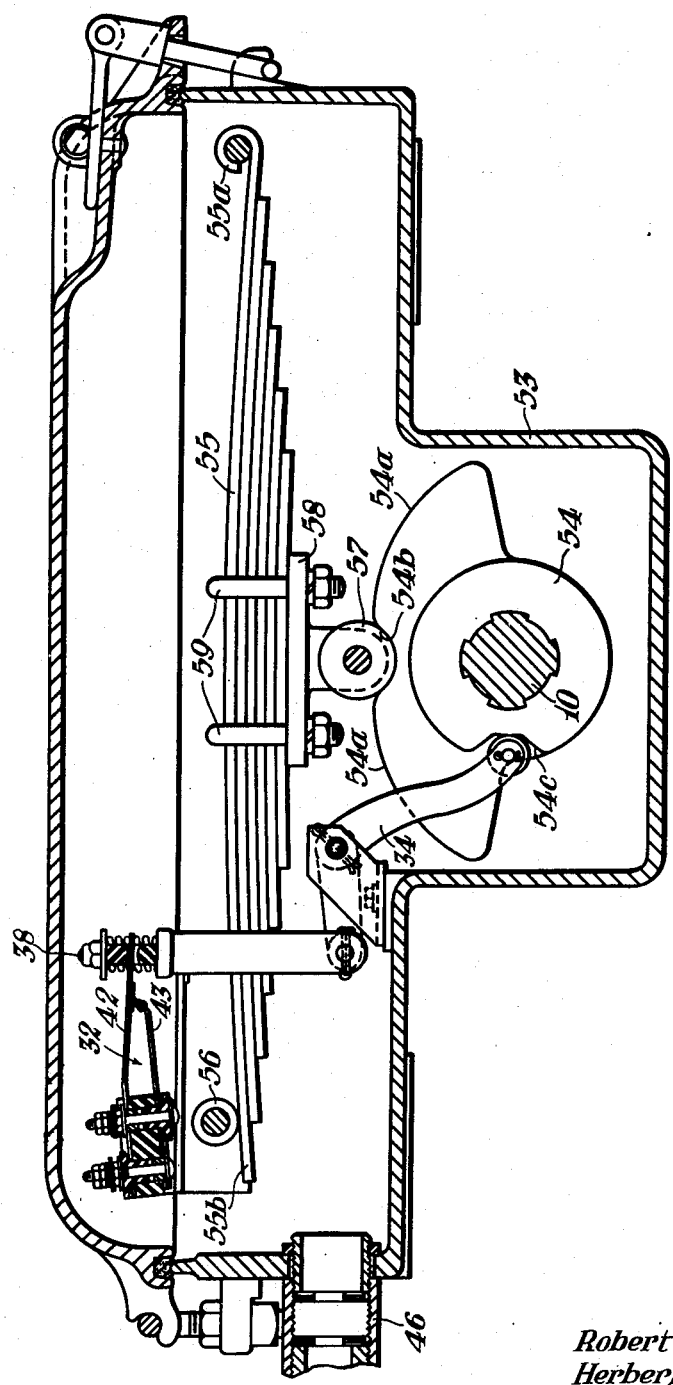

In the accompanying drawings, Fig. 1 is a top plan view showing a dragging equipment detector embodying our invention applied to a railway track. Fig. 2 is an elevational view of the dragging equipment detector shown in Fig. 1. Fig. 3 is an end view of the dragging equipment detector shown in Fig. 1, as viewed from the right in Fig. 1. Fig. 4 is a sectional view taken on the line IV—IV of Fig. 1. Fig. 5 is an enlarged top plan view of the mechanism B forming part of the detector shown in Figs. 1 and 2, the cover 12 of the mechanism being removed to better illustrate the parts. Fig. 6 is a longitudinal sectional view of the mechanism B, shown in Figs. 1 and 2, taken substantially on the line VI—VI of Fig. 5. Fig. 7 is a sectional view taken on the line VII—VII of Fig. 5. Fig. 8 is a sectional view taken substantially on the line VIII—VIII of Fig. 5. Fig. 9 shows a curve which represents graphically the biasing torque developed by a dragging equipment detector embodying our invention and having one set of dimensions. Fig. 10 is a longitudinal sectional view of an alternate form for the mechanism B. Fig. 11 is a top plan view of still another alternate form for the mechanism B, the cover of which has been removed to illustrate the parts. Fig. 12 is a sectional view of the mechanism shown in Fig. 11 taken substantially on the line XII—XII of Fig. 11. Fig. 13 is a sectional view of the resilient coupling taken substantially along the line XIII—XIII of Fig. 1.

Similar reference characters refer to similar parts in each of the several views.

Referring first to Figs. 1, 2, 3, and 4, the dragging equipment detector in the form here shown comprises a detector member A operatively connected with a mechanism B which embodies our present invention. As will appear hereinafter, the mechanism B includes means for biasing the member A to its normal operative position, and a circuit controller mechanism responsive to actuation of the member A from its normal operative position.

The detector member A is disposed between two adjacent ties 1 of a stretch of railway track, and may have any suitable construction. As illustrated, the detector member A is made up of inverted V-shaped detector plates 2 and 3 secured at their lower ends to a rocker shaft 4 by means of bolts 5. The rocker shaft 4 is of tubular material and extends transversely of the railway track beneath the track rails 6. Shaft 4 is supported at one end for rotary movement by a bearing 7 secured to a strap 8 attached to the ties 1, and is operatively connected at the other end through the medium of a resilient coupling 9 with a shaft 10 forming part of the mechanism B.

The plates 2 and 3 are normally held in vertical positions, as shown, by the mechanism B so that equipment or other objects improperly dragging from railway rolling stock will engage the detector plates and thus rotate the member A either to the right or the left, as viewed in Fig. 4, depending on the direction of travel of such rolling stock. The angular limits through which the member A is permitted to rotate is determined as shown by the adjacent top edges of the ties 1 functioning as stops. It will readily be seen that the inverted V shape of the detector plates lessens the likelihood of dragging equipment grabbing them and causing damage to either or both the detector and the train. As here shown the plates 2 and 3 are made of light steel, but it should be noted that they may be made of or lined with a resilient material, such as moulded rubber, to absorb some of the shock transmitted to the detector by the striking object.

Referring now to Figs. 5, 6, 7, and 8, the mechanism B as here shown comprises a suitable housing 11 closed at its upper end by a removable cover 12 and provided with lugs 11a for the reception of lag screws or the like whereby it may be secured to the ties 1 adjacent one end of the shaft 4 in a position in which the shaft 10 aligns with the shaft 4. The shaft 10 is journaled in bearings 13 and 14 (see Fig. 8) formed in the opposite side walls of the housing and is provided intermediate the bearings with a spline portion 10a for the reception of a cam 15 which is constrained to rotate with the shaft. The splined portion 10a is smaller in diameter than the portion which is disposed in the bearing 13, but is larger in diameter than the portion which is disposed in the bearing 14. It will therefore be seen that the shaft 10 can be readily assembled in the housing 11 by inserting the shaft through the bearings and the cam 15 from the left, as viewed in Fig. 8. The shaft 10 is restrained from longitudinal movement by a retaining washer 16 suitably secured to the small end of the shaft, such as by a tap bolt 17 and a lock washer 18. The washer 16 cooperates with a boss surrounding the outer end of the bearing 14 to prevent movement of the shaft to the left, as viewed in Fig. 8. Movement of the shaft to the right, as viewed in Fig. 8, is prevented by the shoulder formed on the shaft between the splined portion 10a and the portion which is disposed in the bearing 14. The cap 19 is suitably secured, as by machine bolts 20, to the housing 11 and serves to provide a weathertight seal for the bearing 14.

As best seen in Fig. 6, the cam 15 is provided with two identical cam surfaces 15a which are symmetrically disposed on either side of an indentation 15b. For a purpose to be hereinafter related, each of the cam surfaces 15a is so formed that the curvature of the portion adjacent the indentation 15b is of a greater degree than the curvature of the remaining portion of the surface Furthermore, the curvature of each surface 15a is such that the radial distance of the surface from the axis of shaft 10 increases progressively from a minimum value starting at the one end of the surface which is adjacent the indentation 15b to a maximum value adjacent the other end of the surface. Cam 15 is also provided with a notch 15c for a purpose to be hereinafter described in detail.

Although, as shown in Figs. 5, 6, 7 and 8, the cam surface 15a and notch 15c are symmetrically disposed about the horizontal centerline for the shaft 10, it is not intended that the invention be limited to this particular circumferential positioning of the cam surfaces relative to the normal position of shaft 10, such positioning being dependent on the arrangement of the remaining parts in the mechanism B as will appear more fully hereinafter.

The cam 15 forms part of a biasing means 21 for biasing the detector member A to its normal operative position in which it is shown in Figs. 1, 2, and 3. The biasing means includes in addition to the cam an arm 27 pivotally mounted at its lower end on a pin 28 supported in spaced lugs formed on the bottom wall of the housing 11, and provided intermediate its ends with a roller 26 which cooperates with the cam surfaces 15a and the indentation 15b of the cam 15. The upper end of the arm 27 is connected by means of a yoke 27a with the right-hand ends, as viewed in Fig. 5, of two coil springs 22, the opposite ends of which are anchored to housing 11 by eyebolts 23. The eyebolts 23 are provided with nuts 24 and 25, and it will be seen that by proper adjustment of these nuts the tension in the springs 22 can be readily varied as desired. The springs 22 are under an initial tension in the normal position as shown, and it will be obvious therefore that the roller 26 is biased to the left, as viewed in Fig. 6, with a force that is greater than that developed by the springs themselves due to the mechanical advantage afforded by the arm 27.

It will also be obvious that rotation of the cam 15 on the shaft 10 in either direction will cause the roller 26 to roll out of the indentation 15b onto one or the other of the surfaces 15a, and due to the previously described shape of the cam, this will cause a biasing force to be exerted on the shaft 10 which constantly urges it to the position in which the roller is in the indentation 15b. It follows that any torque tending to produce rotation of the cam, such as a torque transmitted to the cam by reason of the detector member A being struck by a moving object, will be opposed by a biasing force which depends upon the adjustment of the eyebolts 23 and the proportioning of the parts. It also follows that if the torque tending to produce rotation of the cam 15 is less than the initial torque exerted by the biasing force, the cam and therefore the detector member A will be maintained in their normal positions as shown in drawings. If, however, the torque tending to produce rotation is greater than the initial biasing torque, the detector member A and the cam 15 will be rotated, within the angular limits imposed on the detector plates 2 and 3 by the ties 1, until either the point is reached at which the biasing torque equals the rotating torque or until the detector member A is stopped by the ties 1. The extreme rotated positions of the cam 15 are indicated by the dotted representations in Fig. 4. Should the ties 1 fail for some reason to act as a stop for the detector plates 2 and 3, the cam surfaces 15a are of sufficient length to permit overtravel of the roller 26 in either direction until the cam engages a stop 29 integrally formed or otherwise attached to the housing 11.

Due to the previously described curvature of each cam surface 15a the restoring force exerted on the shaft 10 when the shaft is displaced in either direction from its normal position in which the roller 26 is disposed in the indentation 15b first increases slightly from an initial relatively large value, then decreases to a minimum value, and finally increases progressively from the minimum value throughout the remainder of cam rotation, so that the maximum torque is exerted at the end of the stroke. This variation is indicated graphically by the curve 31 in Fig. 9 for one particular adjustment and proportioning of the parts.

It should be pointed out that the relatively high initial biasing torque which is obtained with mechanism constructed as just described is effective to prevent undesirable actuation of the detector due to forces below those normally provided when the detector is struck by a dragging object. It should also be pointed out that the fact that the torque subsequently decreases over a considerable angle of rotation of the shaft is also highly desirable because it insures that full actuation may be had after the relatively high impact of a striking object improperly hanging from a passing train is spent. It is intended that the cam 15 and the biasing means 21 be designed to exert the maximum initial biasing torque capable of being overcome by the striking engagement of the usual dragging equipment or other objects likely to cause damage to the train so that accidental or malicious attempts to operate the detector will be effectively prevented.

For the purpose of displaying restrictive aspects ahead of a passing train after actuation of the detector by the train, there is included as part of the mechanism B a circuit controller operable in response to rotation of the detector member A. The circuit controller is designated generally in Figs. 5 and 6 by the reference character 32 and as here shown comprises a roller 33 rotatably mounted at one end of a bell crank 34 which is rockable about a pivot bracket 35 suitably secured to the housing 11. The roller 33 is disposed in the notch 15c of cam 15 when the cam is in its normal position as shown. Rotation of cam 15 causes roller 33 to roll up either side of notch 15c, depending on the direction of cam rotation, and to be displaced to the left, as viewed in Fig. 6. Movement of roller 33 to the left is effective to rock the bell crank 34 clockwise about pivot bracket 35 and moves upwardly against the bias of compression springs 36 a contact operating bracket 37 pivotally connected to the other end of the bell crank between bifurcations 37a. The bracket 37 is guided for vertical movement of studs 38 which are screwed into tapped holes in angles 39. Springs 36 are mounted on the studs 38 and are maintained under an initial compression between nuts 40 and bracket 37. The angles 39 are suitably secured to the upper sidewalls of housing 11 and serve as supports for a well-known type of insulating contact board 41. Contact board 41 may be provided with either or both normally open and normally closed contacts, as desired, but, as here shown, we prefer to employ normally closed contacts having movable spring contact fingers 42 and fixed spring contact fingers 43 suitably connected to associated terminal posts 42a and 43a, respectively. The movable finger 42 of each contact 42—43 extends with clearance through a slot formed between insulating contact supports 44 suitably secured to the upper side of contact operating bracket 37, such as by means of machine screws 45. Accordingly, the movable fingers 42 are operated either away from or to their engaging positions with the associated fixed fingers 43 when vertical movement of bracket 37 is had in response to rotation of cam 15; and, it follows that signal and other circuits as desired may be led through a wiring outlet 46 in the housing 11 and connected to the terminal posts of contacts 42—43 to be controlled thereby.

Referring now to Fig. 10, we have here shown another form which the mechanism B may assume. As here shown, a housing 47 supports the shaft 10 and cam 15 in a manner similar to the housing 11. The means cooperating with the shaft 10 to bias it to its normal operative position, however, comprises a single compression spring 48 horizontally disposed in the upper portion 47a of housing 47. Spring 48 is operatively connected with the upper end of arm 27 through the medium of an end member 49. A plunger rod 51 longitudinally disposed within spring 48 is affixed at one end to member 49 and is guided for movement adjacent its other end by an elongated thimble 52. The thimble 52 abuts against the closed end of housing portion 47a to restrain the spring end 48a from moving to the right, and, together with rod 51 and member 49 acts to maintain the spring in longitudinal alignment and under an initial compression in the unoperated position as shown. It will therefore be obvious that the cam 15 is again biased to an intermediate position and that the biasing torque produced by rotation of the cam will vary as indicated in the curve 31. The circuit controller of Fig. 10 is similar to that shown in Figs. 5, 6, and 7 with the exception that the contact structure is positioned on the opposite side of the operating bracket 37 for compactness.

Referring now to Figs. 11 and 12, a housing 53 supports the shaft 10 and a cam 54 in a manner similar to that in which housing 11 supports shaft 10 and cam 15 in Figs. 5, 6, 7, and 8. The cam 54 is identical with cam 15 except that cam surfaces 54a have been shifted 90° counterclockwise to a position of symmetry about the vertical centerline for the shaft 10. In this form of the mechanism B, the biasing means comprises two coextensive leaf springs 55 horizontally disposed above the cam 54, each of which springs is affixed at one end 55a to the housing 53 and restrained from upward movement adjacent its movable other end 55b by a roller stop 56 mounted between the sidewalls of housing 53. A cam following roller 57 is rotatably mounted in brackets 58 attached to the undersides of leaf springs 55 by U-bolts 59. Roller 57 has the same cross section for the portion making contact with the cam surfaces 54a as does the roller 26, and the parts are so proportioned that the springs 55 are initially stressed in the position shown to effect a biased interrelationship. It will again be obvious that the cam 54 functions in the same manner as the cam 15 to bias the shaft 10 to an intermediate position and that the biasing torque produced by rotation of the cam 54 will vary as indicated in the curve 31. The circuit controller of Figs. 11 and 12 is similar to that shown in Figs. 5, 6, and 7.

As best seen in Figs. 8 and 13, the previously referred to resilient coupling 9 comprises a collar 60 of resilient material, such as rubber secured by means of a bolt 61 and a nut 62 between the end 4a of the rocker shaft 4 and the end 10b of the shaft 10. The shaft end 4a is divided by means of sawkerfs 4b into two halves and the bolt 61 extends through registering clearance holes in the shaft 4, the shaft 10 and the collar 60 in such manner that when the nut 62 is tightened the two halves will be urged together and will thus compress the resilient collar between the two shafts 4 and 10. It will be seen therefore that any torque which is transmitted from the shaft 4 to the shaft 10 or vice versa will be transmitted through the resilient collar 60 in torsion, with the result that the coupling 9 will serve to cushion the transmitted force.

One advantage of a dragging equipment detector embodying our invention is that the mechanism B combines in one compact housing the biasing means and circuit controller.

Another advantage of a dragging equipment detector embodying our invention is that it includes means for protecting it against malicious or accidental actuation, which means does not require replacement or adjustment after action of the controller.

Although we have herein shown and described only three forms of dragging equipment detector embodying our invention, it is to be understood that various changes and modifications may be made therein within the scope of the appended claim without departing from the spirit and scope of our invention.

Having thus described our invention, what we claim is:

Means combined in a single housing for automatically restoring the pivotally mounted detecting member of a dragging equipment detector from an operated position to a normal position, said means comprising an arm pivotally connected at one end to said housing, a cam following roller mounted on said arm intermediate its ends, a cam adapted to be operatively connected with said detecting member and cooperating with said roller in a manner to cause movement of the roller and said arm in one direction when the cam is rotated in either direction from an intermediate position in which the detecting member occupies its normal position, a circuit controller operable in response to rotation of said cam in either direction from its intermediate position, and an extensible spring one end of which is anchored to said housing in a manner permitting adjustment of the tension in the spring and the other end of which is secured to the free end of said arm, said spring being under an initial tension so that the roller is constantly biased through the medium of said arm against said cam in opposition to movement of the roller and arm in the said one direction, said cam being so shaped that the bias exerted on the cam by the roller opposes rotation of said detecting member and the cam in either direction away from their respective normal and intermediate positions with a torque which is materially greater during initial rotation of the member and cam than it is after the member and cam have rotated a predetermined distance from their respective normal and intermediate positions.

References Cited in the file of this patent

UNITED STATES PATENTS

| Number | Name | Date |
| --- | --- | --- |
| 1,458,894 | Schwarz | June 12, 1923 |
| 1,892,037 | Crews | Dec. 27, 1932 |
| 2,021,568 | North et al. | Nov. 19, 1935 |
| 2,095,616 | Post | Oct. 12, 1937 |
| 2,128,373 | Mekelburg | Aug. 30, 1938 |
| 2,272,900 | Saurer | Feb. 10, 1942 |
| 2,401,501 | Olah | June 4, 1946 |
| 2,435,365 | Post | Feb. 3, 1948 |

FOREIGN PATENTS

| Number | Country | Date |
| --- | --- | --- |
| 9,454 of 1842 | Great Britain | Aug. 25, 1842 |